(12) United States Patent
Pelliccia et al.

(10) Patent No.: US 8,052,170 B2
(45) Date of Patent: Nov. 8, 2011

(54) LOCKING HEIGHT ADJUSTER FOR A SEAT BELT

(75) Inventors: Nick John Pelliccia, Rochester, MI (US); Christopher Joe Kranz, Troy, MI (US); Thomas Grzybowski, Fraser, MI (US); Brandon Scott Marriott, Waterford, MI (US); Paul Michael Smith, Davison, MI (US); David Sanders, Shelby Township, MI (US); April Lee Lampkowski, Grand Blanc, MI (US); Lyle William Dunham, Rochester Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 96 days.

(21) Appl. No.: 12/385,144

(22) Filed: Mar. 31, 2009

(65) Prior Publication Data

US 2009/0261566 A1    Oct. 22, 2009

Related U.S. Application Data

(60) Provisional application No. 61/071,327, filed on Apr. 22, 2008, provisional application No. 61/071,328, filed on Apr. 22, 2008.

(51) Int. Cl.
*B60R 22/30* (2006.01)
*B60R 22/10* (2006.01)

(52) U.S. Cl. .................. 280/808; 280/801.2; 280/807; 297/473; 297/474; 297/483; 24/170

(58) Field of Classification Search ............. 280/801.2, 280/806, 807, 808, 801.1; 297/468, 474, 297/483, 473, 485; 24/170, 171
See application file for complete search history.

(56) References Cited

U.S. PATENT DOCUMENTS 4,893,835 A * 1/1990 Linden .................. 280/808
2008/0122214 A1 * 5/2008 Bell et al. .............. 280/801.1

* cited by examiner

*Primary Examiner* — Ruth Ilan
*Assistant Examiner* — Keith Frisby
(74) *Attorney, Agent, or Firm* — Foley & Lardner LLP

(57) ABSTRACT

A seat belt system for a vehicle may include a tongue configured to slidably engage a seat belt; a retractor coupled to a portion of the vehicle, the retractor configured to receive the seat belt; and a height adjuster. The height adjuster may include a guide webbing configured to be secured to a portion of the vehicle; a frame supporting a locking mechanism; and a supporting surface to support the seat belt as the seat belt changes direction. The position of the frame relative to the guide webbing is adjustable. The locking mechanism is configured to lock the frame in a position relative to the guide webbing by clamping the guide webbing without input from the user and stays in position during a crash.

13 Claims, 9 Drawing Sheets

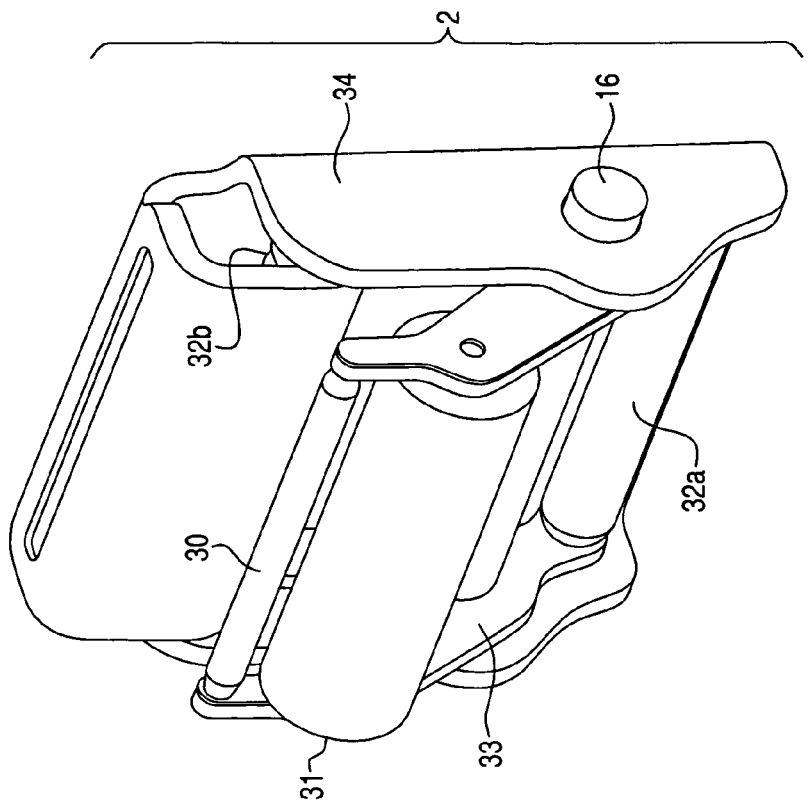
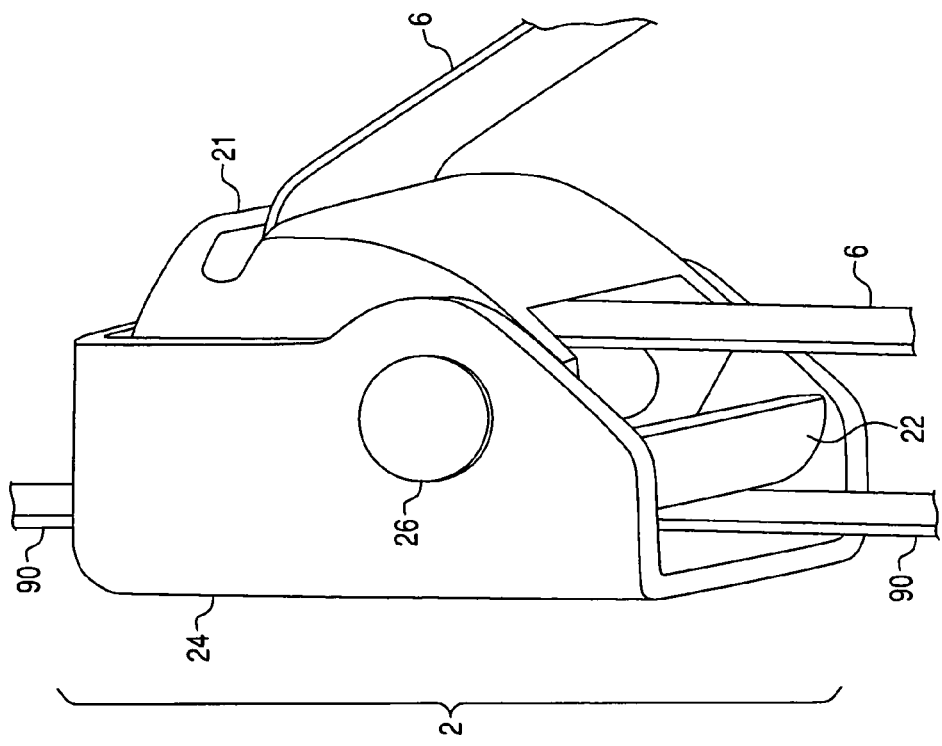

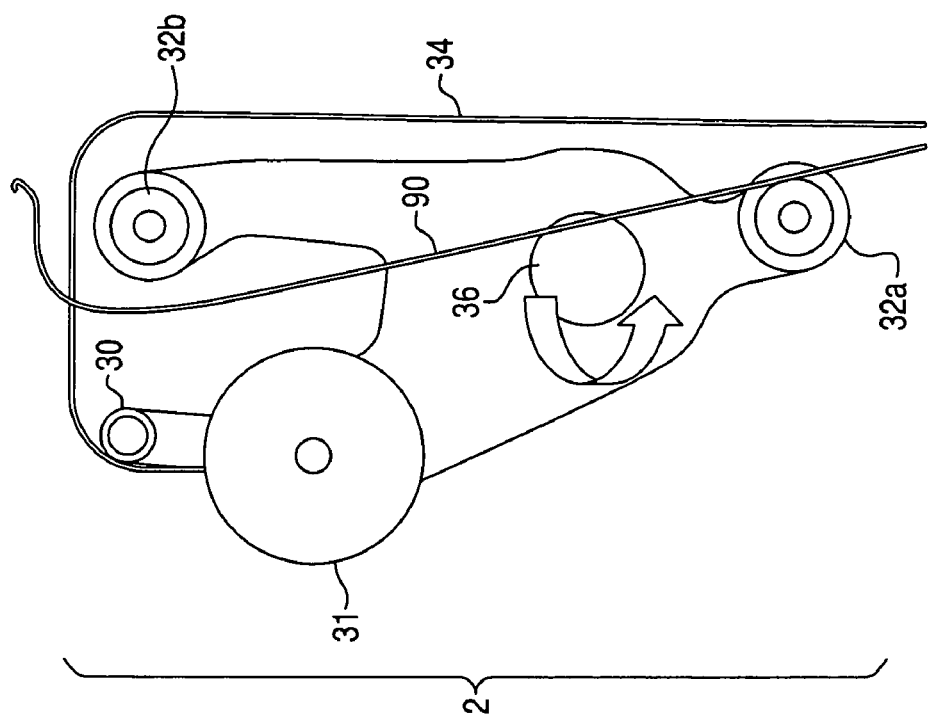
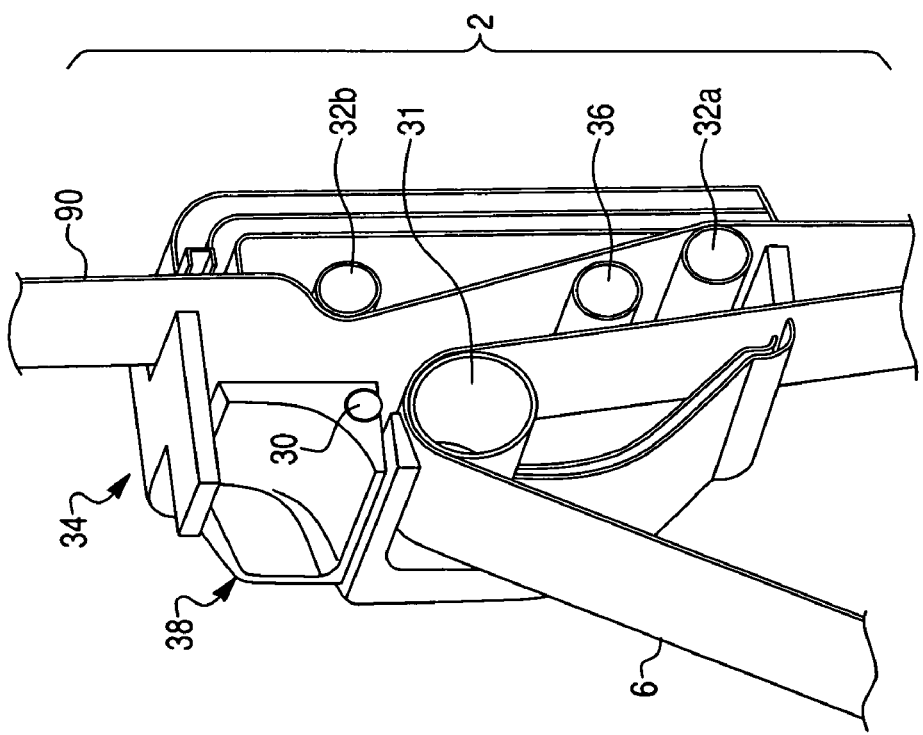

LOCKING HEIGHT ADJUSTER FOR A SEAT BELT

CROSS-REFERENCE TO RELATED PATENT APPLICATIONS

This application claims priority to and the benefit of U.S. Provisional Patent Application Nos. 61/071,327 and 61/071,328, both filed on Apr. 22, 2008. The two foregoing provisional patent applications are incorporated herein by reference in their entireties.

BACKGROUND

The present application relates to the technical field of seat belt height adjusters, which attach to a motor vehicle such as an automobile or the like, used in a seat belt system for allowing proper placement of the seat belt across an occupant's body and for remaining stationary during a sudden acceleration or deceleration of a vehicle.

Seat belt systems for vehicles generally restrain an occupant with a lap belt and a shoulder belt formed from a flexible webbing. Seat belt systems for vehicles may include an adjustable design that allows the angle of the shoulder belt to be altered. Proper placement of the webbing across the occupant's body is important to maximize the effectiveness of the seat belt.

Some products use a moveable clip to allow for infinitely adjustable contact points between the shoulder belt and the occupant. However, such clips do not provide adequate locking features to address the slippage of the point proximate to the shoulder of the occupant under crash loads. The slippage allows the guide webbing to shift and may therefore allow greater upper torso and head movement of the occupant during a sudden change in acceleration of the vehicle.

Seat belt systems generally include a moveable D-ring or automatic turning loop. The D-ring is mounted to the side of the vehicle and provides an upper pivot point for the shoulder belt. In some seat belt systems, the D-ring moves along a metal track attached to the vehicle frame. Such adjustable systems may be relatively expensive to install and generally require a button or lever that must be activated to adjust the height of the D-ring.

SUMMARY

According to one disclosed embodiment, a height adjuster for a vehicle seat belt includes a guide webbing configured to be secured to a portion of the vehicle. The adjuster further includes a frame supporting a locking mechanism; and a supporting surface to support the seat belt as the seat belt changes direction. The position of the frame relative to the guide webbing may be adjustable. The locking mechanism may be configured to lock the frame in a position relative to the guide webbing by clamping the guide webbing.

According to another disclosed embodiment, a height adjuster for a vehicle seat belt may include a guide webbing configured to extend through the height adjuster. The adjustor also includes a frame supporting a locking mechanism; and a supporting surface to support the seat belt as the seat belt changes direction. The position of the frame relative to the guide webbing may be adjustable and the locking mechanism may be configured to lock the frame in a position relative to the guide webbing by clamping the guide webbing. The locking mechanism pivots relative to the frame.

According to yet another disclosed embodiment, there is a seat belt system for a vehicle. The seat belt system for the vehicle includes a tongue configured to slidably engage a seat belt; a retractor coupled to a portion of the vehicle, the retractor configured to receive the seat belt; and a height adjuster. The height adjuster includes a guide webbing configured to be secured to a portion of the vehicle; a frame supporting a locking mechanism; and a supporting surface to support the seat belt as the seat belt changes direction. The position of the frame relative to the guide webbing is adjustable. The locking mechanism is configured to lock the frame in a position relative to the guide webbing by clamping the guide webbing.

It is to be understood that the foregoing general description and the following detailed descriptions are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 4 shows an assembled perspective view of a height adjuster according to another disclosed embodiment.

FIG. 5 shows another assembled perspective view of a height adjuster according to another disclosed embodiment.

FIG. 6 shows a side view of the height adjuster of FIG. 5.

FIG. 7 shows another side view of the height adjuster of FIG. 5.

DETAILED DESCRIPTION

Figure 1:
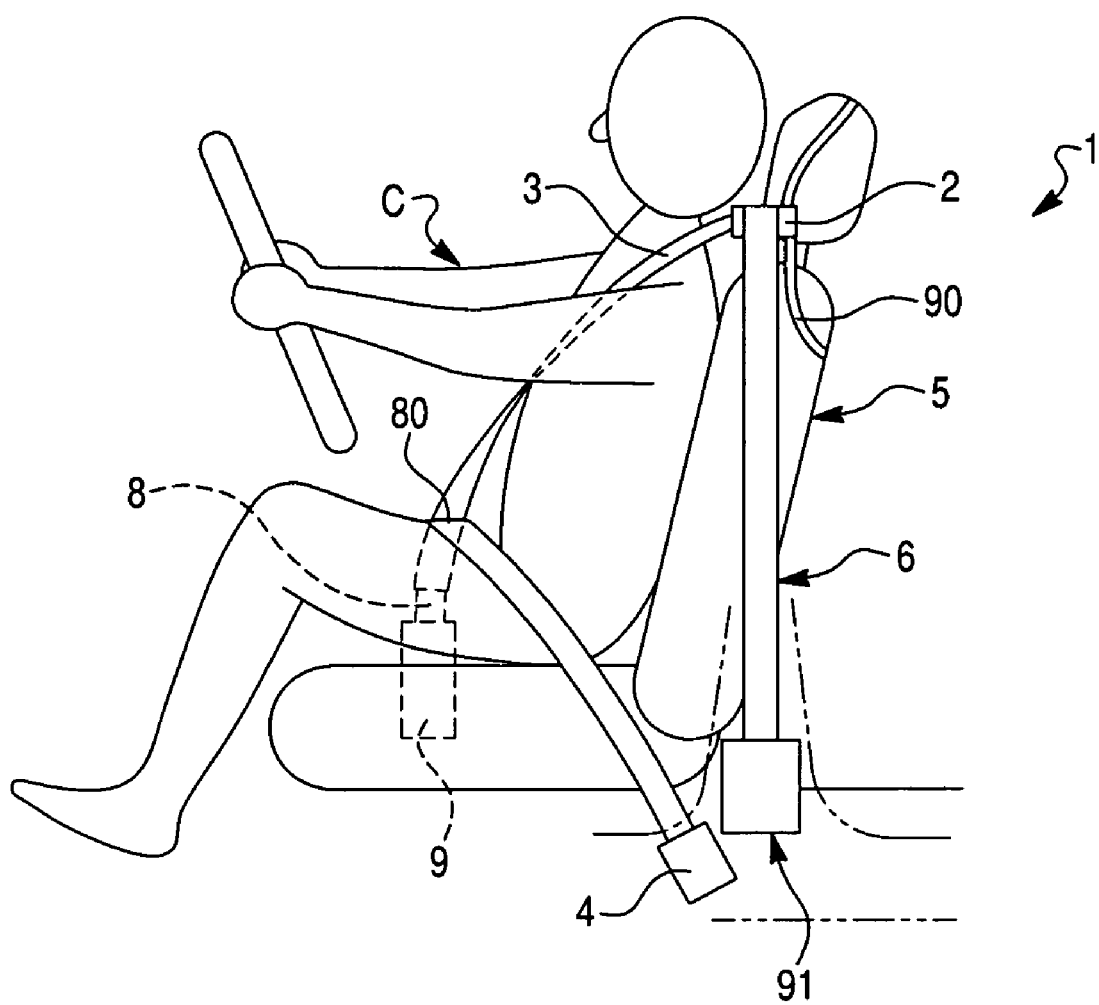
FIG. 1 shows a view of a portion of a vehicle showing a seat belt system according to an exemplary embodiment.

Various disclosed embodiments are now described by referring to the accompanying drawings. FIG. 1 shows a portion of a vehicle illustrating an example of a seat belt system having a height adjuster for a vehicle seat belt.

As illustrated in FIG. 1, the seat belt system 1 includes a seat belt retractor 91, a seat belt 6, a tongue 8, a buckle 9, a height adjuster 2, and a guide webbing 90. The seat belt retractor 91 is configured to guide the seat belt 6 between winding and unwinding. The seat belt retractor 91 includes a plurality of springs and mechanisms (not shown) configured to pretension the seat belt 6 in the winding direction.

The seat belt 6 is withdrawn from the seat belt retractor 91 and provided, at its end, with a belt anchor 4, which may be fixed to the floor of the motor vehicle body or a motor vehicle seat 5.

The height adjuster 2 acts as a shoulder anchor 2. The shoulder anchor 2 may be attached to a center pillar of the motor vehicle body and guides the withdrawn seat belt 6 from the seat belt retractor 91 to a shoulder of an occupant C. The shoulder anchor 2 may also be attached to other portions of the motor vehicle body or seat.

The tongue 8 is slidably supported by the seat belt 6. The tongue 8 slides with respect to the seat belt 6 when the seat belt is in an unbuckled position. In a buckled position the tongue 8 is engaged with the buckle 9.

The buckle 9 is fixed with respect to the vehicle. The buckle 9 may be fixed to the floor of the motor vehicle body or the motor vehicle seat 5. The buckle 9 may include a latch to prevent unwanted disengagement from the tongue 8. The latch is configured to secure a portion from the tongue 8. The latch is further configured to selectively release the tongue 8 either manually or automatically.

When the tongue 8 is engaged with the buckle 9, the seat belt 6 extends from the belt anchor 4, crosses the waist of the occupant C, and passes through the tongue 8 to form the lap portion 80 of the seat belt system 1. The seat belt 6 then crosses diagonally across the torso of the occupant C to the shoulder anchor 2, forming the shoulder portion 3 of the seat belt system 1. The seat belt 6 extends substantially vertically downward from the shoulder anchor 2 to the seat belt retractor 9.

The height of the shoulder anchor 2 determines the angle of the shoulder portion 3 and the placement of the shoulder portion 3 across the occupant C. If the shoulder anchor 2 is too high, the shoulder portion 3 of the seat belt 6 may pass too close to the head or neck of the occupant C. If the shoulder anchor 2 is too low, the shoulder portion 3 of the seat belt 6 may pass over the shoulder and/or upper arm of the occupant C. Because occupants C of a wide variety of sizes may use the seat belt system 1, adjusting the height of the shoulder anchor 2 is important to reducing the risk of potential injuries to the occupant C. A height adjuster 2 may be adjusted by the occupant C to change the angle at which the seat belt 6 lies across the occupant's C torso.

The height adjuster or shoulder anchor may be moved vertically relative to the vehicle frame. Further, the height adjuster 2 is configured to automatically lock into place. The height adjuster 2 utilizes the retractive force of the seat belt 6 to keep the height adjuster 2 fixed in place on the guide webbing 90 without excessive force from the seat belt 6 or input from the occupant C. The height adjuster 2 remains fixed in place when a force is applied to the seat belt 6, such as in a crash event or during hard braking.

Figure 2:
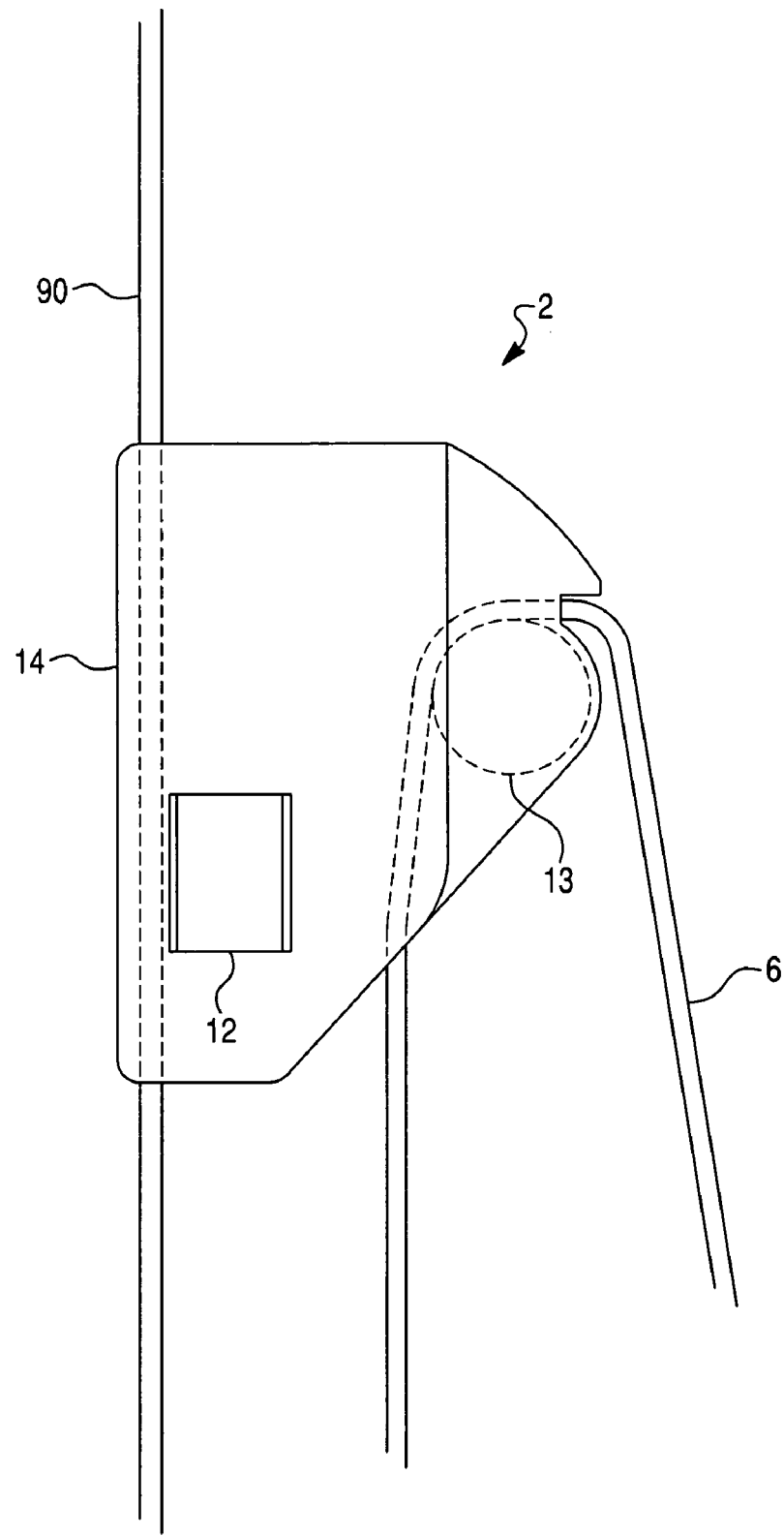
FIG. 2 shows an assembled perspective view of a height adjuster.

As illustrated in FIG. 2, a height adjuster 2 for a seat belt 6 utilizes a guide webbing 90, a frame 14, a supporting surface 13, and a locking mechanism 12.

The height adjuster 2 is coupled to the guide webbing 90. The guide webbing 90 is coupled on both ends. As seen in FIG. 1, the guide webbing 90 may be coupled on both ends to the motor vehicle seat 5 or to the frame of the motor vehicle seat 5. In the alternative, the guide webbing 90 may be coupled to the B-pillars of the vehicle or the guide webbing 90 may be coupled to another portion of the vehicle frame. The guide webbing 90 may also be coupled to anchors or brackets, where the anchors or brackets are attached to a portion of the vehicle. The anchors or brackets may be attached to the vehicle frame, the B-pillars, or the motor vehicle seat 5.

The guide webbing 90 enters the height adjuster 2 at one end of the frame 14 and exits the height adjuster 2 at another end of the frame 14. The frame 14 includes the locking mechanism 12. The locking mechanism 12 may be a multitude of shapes and sizes. For example, the locking mechanism 12 may have square cross sections, polygonal cross sections, a circular cross section, or a crescent moon-type cross section. Other cross sections of the locking mechanism 12 are also possible.

The frame 14 is attached to the supporting mechanism 13. The supporting mechanism 13 provides a guide and support for the seat belt 6. The supporting mechanism 13 may be a multitude of shapes and sizes. The supporting mechanism 13 may have a polygonal cross section, a circular cross section, or a crescent moon-type cross section. Other cross sections of the supporting mechanism 13 are also possible.

The frame 14 may be formed, for example, from sheet metal, so that the frame includes two side walls. In an alternate embodiment, the frame 14 may be molded. Other materials for forming the frame 14 are also possible.

The frame 14 may be designed to absorb the force of an occupant C striking the height adjuster 2, such as during a sudden acceleration or deceleration of the vehicle. Before a sudden change in acceleration of the vehicle, the locking mechanism 12 of the height adjuster 2 is in a first position. When the locking mechanism 12 is in the first position, the occupant C may adjust the height of the shoulder anchor 2 by sliding the height adjuster 2 along the length of the guide webbing 90. After the occupant C adjusts the height adjuster 2 to a comfortable position, the height adjuster 2 self locks into place. The tension in the guide webbing 90 and the tension in the seat belt 6 is sufficient to pull on the supporting mechanism 13 with enough force to induce sufficient clamping friction on the guide webbing 90, such as to hold the height adjuster 2 in place.

The height adjuster 2 is configured to lock into place if a force is applied to the seat belt 6, such as during a sudden change in acceleration of the vehicle. During a sudden change in acceleration of the vehicle, the occupant's C inertia causes a force on the seat belt 6 that causes the seat belt 6 to move away from the back portion of the motor vehicle seat 5. The force pulls the supporting surface 13 away from the guide webbing 90, causing the guide webbing 90 to be pulled taut. As the guide webbing 90 is pulled taut, the webbing forces the locking mechanism 12 towards a second position. In the second position, the guide webbing 90 is compressed between the locking mechanism 12 and the frame 14, effectively preventing the height adjuster 2 from sliding along the length of the guide webbing 90.

The locking mechanism 12 may include knurling or other surface treatments to increase friction between the locking mechanism 12 and the guide webbing 90. The increased friction prevents the height adjuster 2 from moving along the length of the guide webbing 90 when the locking mechanism 12 is in the second position. When the force on the seat belt 6 is reduced, the locking mechanism 12 moves toward the first position and the height adjuster 2 is allowed to be slid along the length of the guide webbing 90.

The height adjuster 2 and its components may be provided in a wide variety of materials, types, shapes, sizes and performance characteristics. The height adjusters disclosed herein are configured to reduce the production cost and provide for improved packaging capabilities. During normal operation, the position of the height adjuster 2 is connected to the webbing and remains in place without any, action or input from the occupant. During an emergency condition, such as a crash or collision involving the vehicle, the height adjuster 2 is locked in position more firmly against the webbing.

Figure 3:
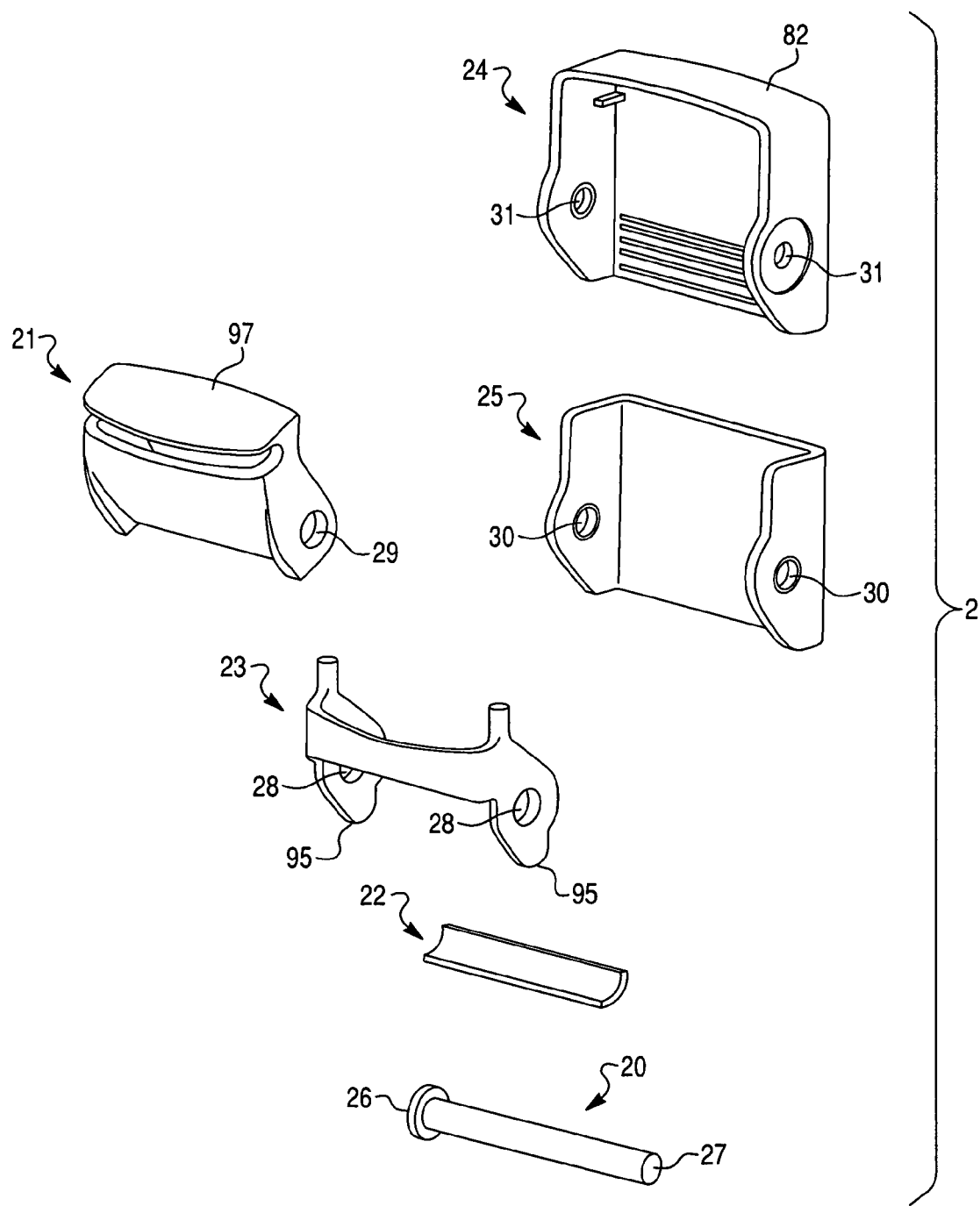
FIG. 3 shows an exploded perspective view of a height adjuster according to another disclosed embodiment.

FIG. 3 and FIG. 4 show one embodiment of the height adjuster 2. The locking mechanism 12 includes the locking bar 22 which is attached to the lever base 23; the supporting surface 13 includes the lever base 23 and lever cover 21; and the frame 14 includes the frame base 25 and frame cover 24.

As shown in FIG. 2 and FIG. 4, the lever cover 21 mounts on top of the lever base 23. The lever base 23 includes a plurality of holes 28 positioned on opposite parallel sides of the lever base 23 The frame base 25 and the frame cover 24 are coupled to each other. The frame cover 24 may be molded onto the frame base 25. The frame base 25, frame cover 24, lever base 23, and lever cover 21 contain a plurality of holes 30, 31, 28, and 29 respectively. A pin 20 connects the frame cover 24 and frame base 25 to the lever cover 21 and lever base 23. The lever cover 21 and the lever base 23 are located between the frame base 25 and the frame cover 24. The pin has a first side 27 and a second side 26. The first side 27 of the pin 20 enters one of the plurality of holes 31 of the frame cover 24 and the frame base 25 and exits the other plurality of hole 31 of the frame cover 24 and the frame base 25. The lever cover 21 and lever base 23 pivot about the pin 20. The guide webbing 90 enters the frame cover 24 through an opening 82.

The locking bar 22 attaches to the lever base 23 and engages the ends 95 of the lever base. In a first position, the locking bar 22 is positioned in between the guide webbing 90 and the seat belt 6. The guide webbing 90 is clamped between the frame cover 24, the frame base 25, and the locking bar 22 to hold the mechanism in place. An occupant C may change the position of the height adjuster 2 by pushing the lever 97, which may be located on the lever cover 21. When the occupant C has adjusted the height adjuster 2 such that the seat belt 6 rests comfortably on the occupant C the occupant C will release the height adjuster. After an occupant C releases the height adjuster, the guide webbing 90 is again clamped between the frame cover 24, the frame base 25, and the locking bar 22 to hold the mechanism in place.

During a sudden change in acceleration of the vehicle, the occupant's C inertia causes a force on the seat belt 6 away from the back portion of the motor vehicle seat 5 such that the locking bar 22 enters a second position. The force on the seat belt 6 pulls the lever frame 21 and lever base 23 tighter to the guide webbing 90. When the lever frame 21 and lever base 23 are pulled toward the guide webbing 90, the locking bar 22 further compresses the guide webbing 90 against the frame base 25 and the frame cover 24.

FIGS. 5-7 show another embodiment of a height adjuster 2. The height adjuster 2 shown in FIGS. 5-7 functions similar to the height adjuster of FIGS. 3-4. However, the height adjuster 2 of FIGS. 5-7 includes a plurality of locking bars 32a, 32b and a pivot bar 36. In another embodiment, the pivot bar 36 may be referred to as a locking bar. As seen in FIGS. 5-7, the locking mechanism 12 includes the first locking bar 32a and the second locking bar 32b; the supporting surface 13 includes the first component 31, the locking lever 33, and the pivot bar (locking bar) 36; and the housing 34 functions as the frame 14.

The guide webbing 90 routes through the top of the housing 34 and out the bottom of the housing 34. The seat belt 6 routes up from an occupant shoulder and over a first component 31. Before a sudden change in acceleration of the vehicle occurs, the guide webbing 90 is trapped between the housing 34 and the first locking bar 32a and the second locking bar 32b. When a sudden change in acceleration of the vehicle occurs, the occupant C moves away from the motor vehicle seat 5. As the occupant C moves away from the motor vehicle seat 5, the seat belt 6 pulls the first component 31 to rotate the locking lever 33 about a pivot bar 16 and further compress the guide webbing 90 between the housing 34 and the first locking bar 32a and the second lock bar 32b. When the guide webbing is locked between the first locking bar 32a and the second locking bar 32b, the height adjuster 2 cannot engage in vertical movement.

A release button 38 or release lever 38 may be coupled to the pin 30. When the occupant C presses the release lever 38, the locking lever 33 rotates to a first position where the first locking bar 32a and the second locking bar 32b are not pressing against the guide webbing 90. When the release lever 38 is pressed, the occupant C may adjust the vertical placement of the height adjuster 2 to modify the position of the seat belt 6. When the release lever 38 is not pressed a mechanism may bias the locking lever 33 into a second position. For example, according to one embodiment a biasing member (not shown), for example a spring, may further bias the locking lever 33 into the second position.

Figure 8:
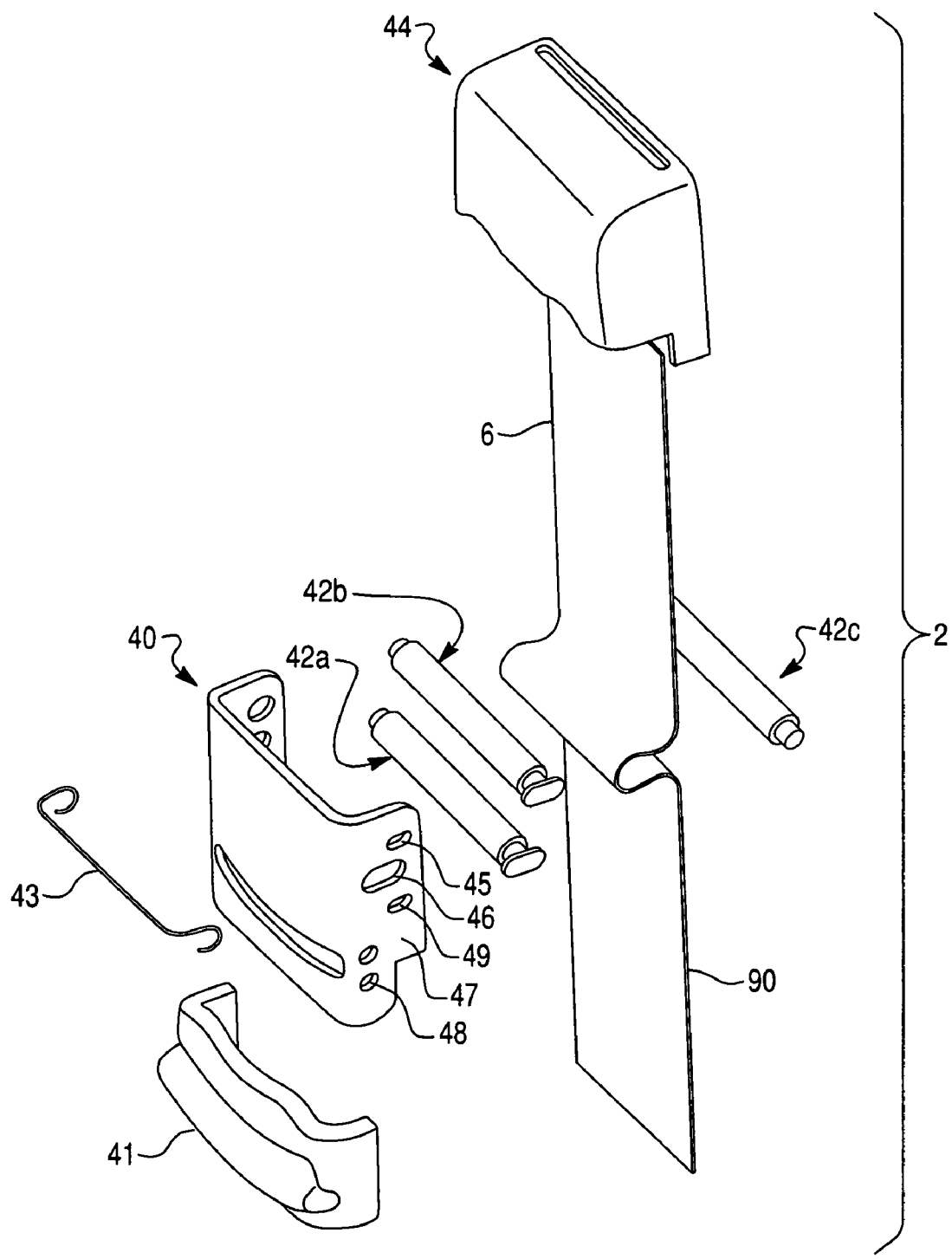
FIG. 8 shows an exploded perspective view of another embodiment of a height adjuster.

FIG. 8 shows yet another embodiment of a height adjuster 2. As shown in FIG. 8, the height adjuster 2 may include a first locking bar 42a, a second locking bar 42b, and a third locking bar 42c, a cover 44, a housing 40, and a first component 41. The locking mechanism 12 includes a first locking bar 42a, a second locking bar 42b, and a third locking bar 42c. The first component 41 is equivalent to the supporting surface 13. The frame 14 includes the housing 40 and the cover 44.

The housing 40 includes two side walls 47. The side walls 47 are spaced apart at a distance to accommodate the width of the guide webbing 90 and include a multitude of openings and slots 45, 46, 48, 49 configured to receive the first locking bar 42a, the second locking bar 42b, and the third locking bar 42c. The third locking bar 42c is provided on one side of the guide webbing 90 while the first locking bar 42a and the second locking bar 42b are located on a side of the guide webbing 90 opposite that of the third locking bar 42c. The third locking bar 42c is positioned below the second locking bar 42b and above the first locking bar 42a. The third locking bar 42c travels about its longitudinal axis and moves relative to the first locking bar 42a and the second locking bar 42b. A biasing member 43 biases the third locking bar 42c towards a first position, in which the locking bar 42c is located away from the first locking bar 42a and the second locking bar 42b. The biasing member 43 may be a spring. In the first position, the occupant C may adjust the height of the shoulder anchor 2 by sliding the height adjuster 2 along the length of the guide webbing 90. In a second position, the third locking bar 42c compresses the guide webbing 90 against the first locking bar 42a and the second locking bar 42b.

The third locking bar 42c may include knurling or other surface treatments to increase friction between the third locking bar 42c and the guide webbing 90. The increased friction helps decrease the chance the height adjuster 2 will slip and move along the length of the guide webbing 90 when the third locking bar 42c is in the second position. When the force on the seat belt 6 is reduced, the biasing member 43 urges the third locking bar 42c toward the first position and decreases the force required to cause the height adjuster 2 to move along the length of the guide webbing 90.

Friction is one of the many factors preventing the height adjuster 2 from sliding along the length of the guide webbing 90. For example, the spring force biasing the third locking bar 42c to the first position, the angle of the slot in which the third locking bar 42c slides, the diameter of the first locking bar 42a, the second locking bar 42b, and the third locking bar 42c and the surface finish of the first locking bar 42a, the second locking bar 42b, and the third locking bar 42c may be altered to increase or decrease the force needed to adjust the position of the height adjuster 2 while still assuring that the height adjuster 2 locks in place during a sudden change in acceleration of the vehicle.

Figure 9:
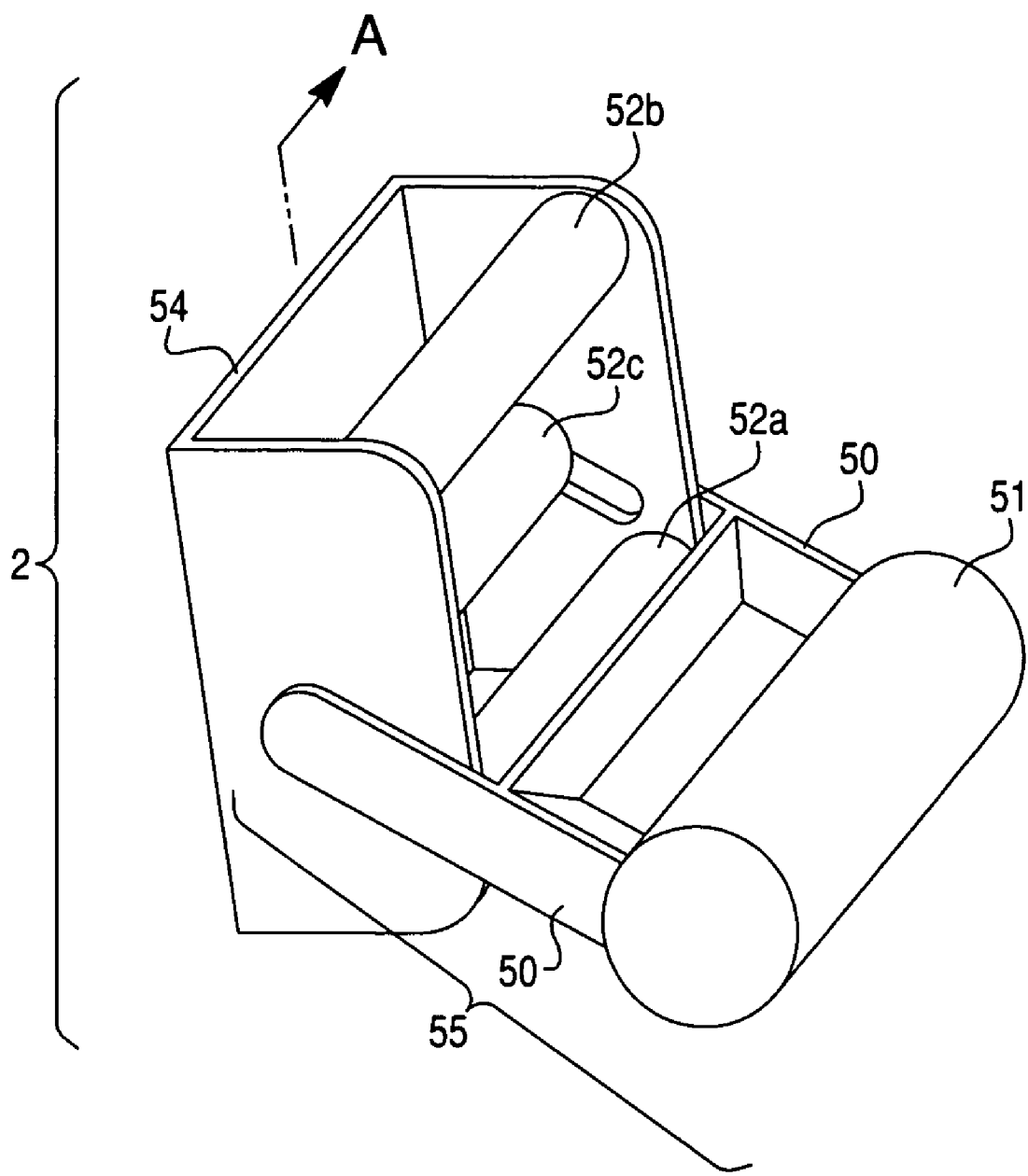
FIG. 9 shows an assembled perspective view of another embodiment of a height adjuster.

FIG. 9 shows another embodiment of a height adjuster. As shown in FIG. 9 the height adjuster 2 may include a first locking bar 52a, a second locking bar 52b, a third locking bar 52c, a housing 54, and a first component 55. The height adjuster 2 shown in FIG. 9 functions similar to the height adjuster of FIG. 8. However, the height adjuster 2 of FIG. 9 also includes arms 50.

The first component 55 includes arms 50 and a first bar 51. The arms 50 are coupled to the third locking bar 52a. The first bar 51 provides a support surface for the seat belt 6. In addition, a cover (not shown) may also be provided that partially surrounds and protects the height adjuster 2.

The height adjusters of FIGS. 8 and 9 provide a mechanism for raising or lowering the shoulder anchor 2 to infinitely adjust the position of the seat belt 6 across the clavicle or torso of the occupant C. The height adjuster 2 allows an occupant C to move the height adjuster 2 without activating a lever, button, or other mechanism. Further, the height adjuster 2 locks into place when force is applied to the seat belt 6 so that the height adjuster 2 does not slip during a sudden change in acceleration of the vehicle. Coupling the height adjuster 2 to the guide webbing 90 reduces manufacturing and assembly costs and negates the need for costly trim or cover pieces.

FIGS. 10-14 show another exemplary embodiment of a height adjuster 2. Similar to the height adjusters 2 of FIGS. 8 and 9, the height adjuster 2 of FIGS. 10-14 allow the shoulder anchor 2 to be moved vertically relative to the vehicle frame. However, the height adjuster 2 of FIGS. 10-14 also includes a lever 95 to control whether the height adjuster 2 is locked in place or free to slide along the length of the guide webbing 90.

Figure 10:
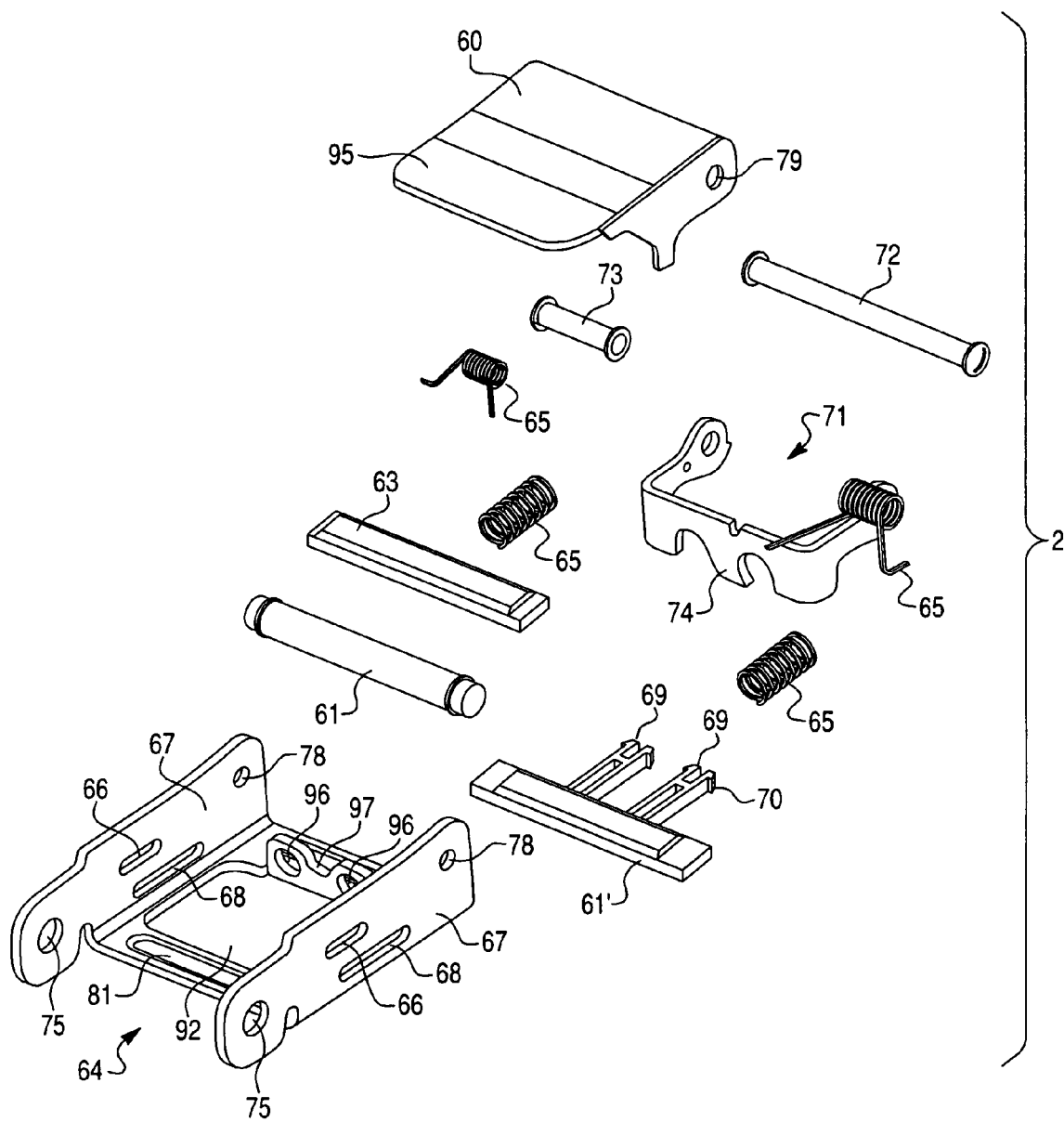
FIG. 10 shows an exploded perspective view of a height adjuster according to another embodiment.

As shown in FIG. 10, the height adjuster 2 includes a frame 64, a locking bar 63, a sliding bar 61' that traps the guide webbing 90 against the locking bar 63, one or more biasing members 65 that urge the sliding bar 61' toward the locked position, a blocking bar 71 that holds the sliding bar 61' in the locked position, and a cover 60 that is operable by the occupant C to move the height adjuster 2 between a locked position and an unlocked position. A bar 72 or other structure coupled to the frame 64 provides a supporting surface for the seat belt 6.

The frame 64 may include two side walls 67. The side walls 67 are spaced apart at a distance to accommodate the width of the guide webbing 90 and include a multitude of slots 66, 68 configured to locate and receive the locking bar 63 and the sliding bar 61'. The locking bar 63 is received by a first set of slots 66 and is held substantially stationary in the frame 64. The sliding bar 61' is received by a second set of longer slots 68 and is allowed to move between a first position and a second position. In a first position, the sliding bar 61' is proximate to the locking bar 63. In a second position, the sliding bar 61' is slid away from the locking bar 63. The sliding bar 61' includes one or more arms 69 that extend away from the main body of the sliding bar 61' and are received by openings 96 in an upturned flange 97 formed by the frame 64.

One or more biasing members 65 bias the sliding bar 61' towards the first position. According to an exemplary embodiment, the biasing members 65 are coil springs that surround the arms of the sliding bar 61' and are trapped between the sliding bar 61' and the upturned flange 97 of the frame 64. The arms 69 of the sliding bar 61' may include features such as barbs or protrusions (not shown) on their ends so the biasing members 65 cannot force the arms 69 of the openings 96 in the flange 97.

The blocking bar 71 is coupled to the frame 64 and includes a contact surface 74. The contact surface 74 can, for example, be a tab. The blocking bar 71 rotates with the cover 60 about an axis formed by a rod 72 coupled to the frame 64. In a closed position, the blocking bar 71 is interposed behind the sliding bar 61', holding the bar in the locked position. The contact surface 74 is angled to help reduce the chance of the blocking bar 71 binding against the sliding bar 61' when the sliding bar 61' is not fully in the closed position. The blocking bar 71 includes cutouts that fit around the arms 69 extending from the sliding bar 61'. An occupant C lifts up on the cover 60 via the lever 95 to move the blocking bar 71 to an open position. In the open position, the blocking bar 71 is moved away from the sliding bar 61', allowing the sliding bar 61' to move along the slots in the frame 64 between the first position and the second position. A biasing member 65, such as a spring, biases the cover 60 and the blocking bar 71 to a closed position.

Figure 11:
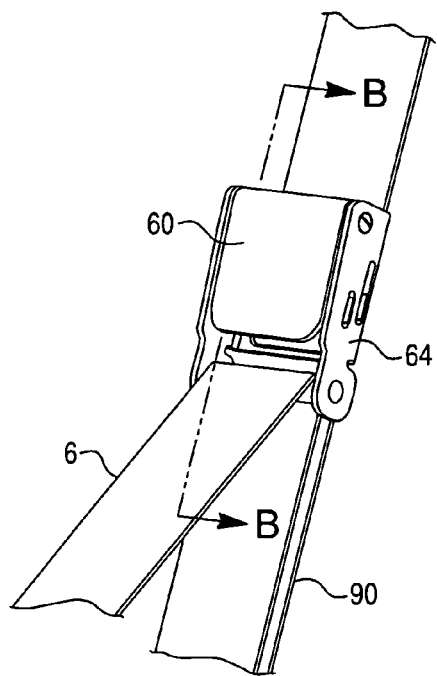
FIG. 11 shows an assembled perspective view of the height adjuster of FIG. 10 including the seat belt and the guide webbing.
Figure 12:
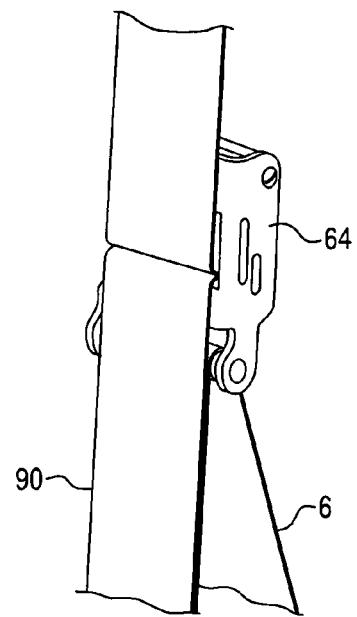
FIG. 12 shows an assembled side view of a height adjuster of FIG. 10 with the seat belt and the guide webbing.
Figure 13:
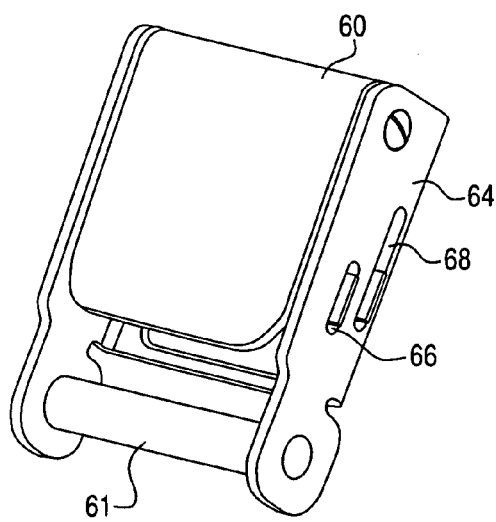
FIG. 13 shows an assembled front view of the height adjuster of FIG. 10.
Figure 14:
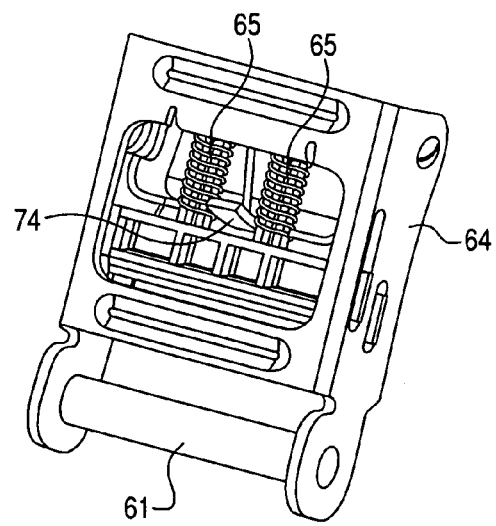
FIG. 14 shows an assembled back view of the height adjuster of FIG. 10.

As shown in FIG. 11, the guide webbing 90 extends inward through a slot in the frame. The guide webbing 90 is wrapped around the locking bar 63 and then passed out through a hole 92 in the frame 64. When in the locked position, the sliding bar 61' presses on the guide webbing 90 between the locking bar 63 and the slot 66, forcing the guide webbing to turn back on itself twice. The geometry of the path of the guide webbing 90 and the friction thereon effectively locks the height adjuster 2 in place. When an occupant C pulls on the cover 60, the blocking bar 71 is retracted from behind the sliding bar 61'. With the blocking bar 71 retracted, when the occupant C tries to slide the height adjuster 2, the guide webbing 90 exerts a force on the sliding bar 61', moving the sliding bar 61' toward the second position. When the sliding bar 61' is moved away from the locking bar 63, the guide webbing 90 is able to follow a more direct path from the locking bar 63 to the slot 66 in the frame 64, lessening the friction on the guide webbing 90 and allowing the occupant C to slide the height adjuster 2 along the length of the guide webbing 90. Releasing the cover 60 allows the blocking bar 71 to move back towards the closed position, interposed behind the sliding bar 61' and retaining the sliding bar 61' in the locked position.

It is important to note that the construction and arrangement of the elements of the height adjuster provided herein are illustrative only. Although only a few exemplary embodiments of the present invention has been described in detail in this disclosure, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A height adjuster for a vehicle seat belt, comprising:
a guide webbing configured to be secured to a portion of the vehicle;
a frame supporting a locking mechanism; and
a supporting surface to support the seat belt as the seat belt changes direction,
wherein the position of the frame relative to the guide webbing is adjustable, and
wherein the locking mechanism is configured to lock the frame in a position relative to the guide webbing by clamping the guide webbing, wherein the locking mechanism comprises a first locking bar configured to clamp the guide webbing against the frame and a second locking bar,
wherein the guide webbing is a different webbing than a webbing of the seat belt.

2. The height adjuster of claim 1, wherein the locking mechanism pivots relative to the frame.

3. The height adjuster of claim 1, wherein the locking mechanism is configured to unlock the frame in a second position when forces exerted against the guide webbing are released.

4. The height adjuster of claim 3, wherein when the locking mechanism is in a second position, an occupant may slidably adjust the vertical height of the height adjuster.

5. The height adjuster of claim 1, wherein the supporting surface and the first locking bar are mounted on the frame.

6. The height adjuster of claim 1, further comprising a lever, wherein the lever is configured to control the movement of the height adjuster relative to the guide webbing.

7. The height adjuster of claim 1, wherein the supporting surface provides a shoulder anchor for the seat belt.

8. The height adjuster of claim 1, wherein the guide webbing is configured to be locked between the first locking bar and the second locking bar.

9. A height adjuster for a vehicle seat belt, comprising:
   a guide webbing configured to extend through the height adjuster;
   a frame supporting a locking mechanism; and
   a supporting surface to support the seat belt as the seat belt changes direction,
   wherein the position of the frame relative to the guide webbing is adjustable,
   wherein the locking mechanism is configured to lock the frame in a position relative to the guide webbing by clamping the guide webbing, and
   wherein the locking mechanism pivots relative to the frame, wherein the locking mechanism comprises a first locking bar configured to clamp the guide webbing against the frame and a second locking bar,
   wherein the guide webbing is a different webbing from a webbing of the seat belt.

10. A seat belt system for a vehicle, comprising:
    a tongue configured to slidably engage a seat belt;
    a retractor coupled to a portion of the vehicle, the retractor configured to receive the seat belt; and
    a height adjuster, wherein the height adjuster comprises:
       a guide webbing configured to be secured to a portion of the vehicle;
       a frame supporting a locking mechanism; and
       a supporting surface to support the seat belt as the seat belt changes direction,
    wherein the position of the frame relative to the guide webbing is adjustable, and
    wherein the locking mechanism is configured to lock the frame in a position relative to the guide webbing by clamping the guide webbing, wherein the locking mechanism comprises a first locking bar configured to clamp the guide webbing against the frame and a second locking bar,
    wherein the guide webbing is a different webbing from a webbing of the seat belt.

11. The system of claim 10, wherein the locking mechanism pivots relative to the frame.

12. The system of claim 10, wherein the locking mechanism is configured to unlock the frame in a second position when forces exerted against the guide webbing are released.

13. The system of claim 12, wherein when the locking mechanism is in a second position, an occupant may slidably adjust the vertical height of the height adjuster.

* * * * *